(12) United States Patent
Wimbauer

(10) Patent No.: US 9,205,584 B2
(45) Date of Patent: Dec. 8, 2015

(54) CLOSING UNIT FOR AN INJECTION MOLDING MACHINE

(71) Applicant: ENGEL AUSTRIA GmbH, Schwertberg (AT)

(72) Inventor: Gerhard Wimbauer, Schwertberg (AT)

(73) Assignee: ENGEL AUSTRIA GMBH, Schwertberg (AT)

( * ) Notice: Subject to any disclaimer, the term of this patent is extended or adjusted under 35 U.S.C. 154(b) by 0 days.

(21) Appl. No.: 14/291,459

(22) Filed: May 30, 2014

(65) Prior Publication Data

US 2014/0370143 A1    Dec. 18, 2014

(30) Foreign Application Priority Data

Jun. 3, 2013  (AT) ...................................... 447/2013

(51) Int. Cl.
*B29C 45/17* (2006.01)

(52) U.S. Cl.
CPC ..... *B29C 45/1761* (2013.01); *B29C 2045/1762* (2013.01); *B29C 2045/1768* (2013.01); *B29K 2995/0037* (2013.01)

(58) Field of Classification Search
CPC .................. B29C 45/1761; B29C 2045/1762; B29C 2045/1768
See application file for complete search history.

(56) References Cited

U.S. PATENT DOCUMENTS

| 5,650,182 | A | | 7/1997 | Fuller et al. |
| 5,783,231 | A | * | 7/1998 | Fuller et al. .................... 425/595 |
| 5,891,488 | A | * | 4/1999 | Wittstock et al. ........... 425/451.9 |
| 6,575,732 | B2 | * | 6/2003 | Kappelmuller ............... 425/595 |
| 2001/0053396 | A1 | | 12/2001 | Kappelmuller |

FOREIGN PATENT DOCUMENTS

| DE | 44 20 639 | 9/1995 |
| DE | 101 21 306 | 12/2001 |
| DE | 10 2009 044 506 | 7/2011 |

OTHER PUBLICATIONS

Austrian Patent Office Search Report (ASR) issued Aug. 4, 2014 in Austrian Patent Application No. A 447/2013.

* cited by examiner

*Primary Examiner* — James Mackey
(74) *Attorney, Agent, or Firm* — Wenderoth, Lind & Ponack, L.L.P.

(57) ABSTRACT

A closing unit for an injection molding machine includes a substantially C-shaped machine frame, to the first leg of which is mounted a stationary mold mounting plate and to the second leg of which is mounted a closing mechanism for driving a moveable mold mounting plate. The free ends of the legs of the machine frame are deformed under the influence of the closing force occurring during the closing operation. The stationary mold mounting plate is supported at or near its lower edge by a support element on the machine frame against the closing force, and is fixedly connected above the lower edge to the first leg. The support element has a flexural beam extending transversely relative to the longitudinal axis of the machine, and a compression bar extending in the direction of the longitudinal axis of the machine.

9 Claims, 4 Drawing Sheets

CLOSING UNIT FOR AN INJECTION MOLDING MACHINE

BACKGROUND OF THE INVENTION

The invention concerns a closing unit for an injection molding machine, and a tie-bar-less injection molding machine having such a closing unit.

A closing unit of the general kind set forth is disclosed, for example, in DE 101 21 306 A1. The change in the orientation of the stationary mold mounting plate, that is caused per se by the closing force, is compensated in part by the support element and in part by the geometrical configuration of the free leg of the machine frame, to which the stationary mold mounting plate is connected. That design permits the stationary mold mounting plate to be fixedly mounted to the free leg of the machine frame and thus avoids the disadvantages of a pivotal mounting of the stationary mold mounting plate. The geometrical configuration required for that purpose for the free leg can be ascertained, for example, by calculation or experiments.

In the closing unit shown there, the support element comprises a compression bar which is in the form of an extension on the stationary mold mounting plate, and which extends in the direction of the longitudinal axis of the machine and which under the closing force presses loosely against a flexural beam extending transversely relative to the longitudinal axis of the machine. High line loadings occur between the compression bar and the flexural beam. The strong internal frictional effects of the support element, that are linked thereto, adversely affect the functionality of the closing unit due to tribocorrosion (fretting corrosion) and shorten the service life of the support element.

In addition, it has proven to be difficult to find satisfactory matching of upsetting by way of the compression bar and flexing by way of the flexural beam with that construction.

SUMMARY OF THE INVENTION

The object of the invention is to provide a closing unit for an injection molding machine and a tie-bar-less injection molding machine having such a closing unit, in which at least the problem of strong internal frictional effects does not arise.

That object is attained by a closing unit having the features described below, and a tie-bar-less injection molding machine have such a closing unit.

The problem of tribocorrosion can be avoided by the backlash-free connection of the flexural beam to the machine frame (for example by screwing).

Preferred embodiments of the invention are defined in the dependent claims.

A further flexural beam can extend transversely relative to the longitudinal axis of the machine, and can be fixedly connected to the stationary mold mounting plate.

The use of two flexural beams which are fixedly connected together by the compression bar makes it possible to ideally select upsetting and flexing in the support element easily by way of experiments.

On the basis of the flexing of each individual flexural beam and the upsetting of the compression bar, it is possible to ascertain approximately (by hand) an overall stiffness which upon transmission of the closing force (for example about ⅓ of the total closing force) causes the required flexing effect (here about 0.5 mm). The required flexing arises out of the requirement that the stationary mold mounting plate is to remain vertical under load. This means that the difference between the deformation of the machine frame at the support of the stationary mold mounting plate in its upper region and the deformation of the machine frame in the region of the lower edge must be absorbed by the support element. More precise ascertainment can be effected by way of a calculation by finite elements. Fine tuning can be effected directly at the injection molding machine. It is possible there to measure the positions of the stationary mold mounting plate (top/bottom/left/right), at which closing forces are transmitted, and what the closing forces are.

Because the compression bar is fixedly connected (directly or indirectly) to both flexural beams, no internal frictional effects occur.

BRIEF DESCRIPTION OF THE DRAWINGS

Further advantages and details of the invention will be apparent from the Figures and the specific description relating thereto, in which.

DETAILED DESCRIPTION OF THE INVENTION

Figure 1:
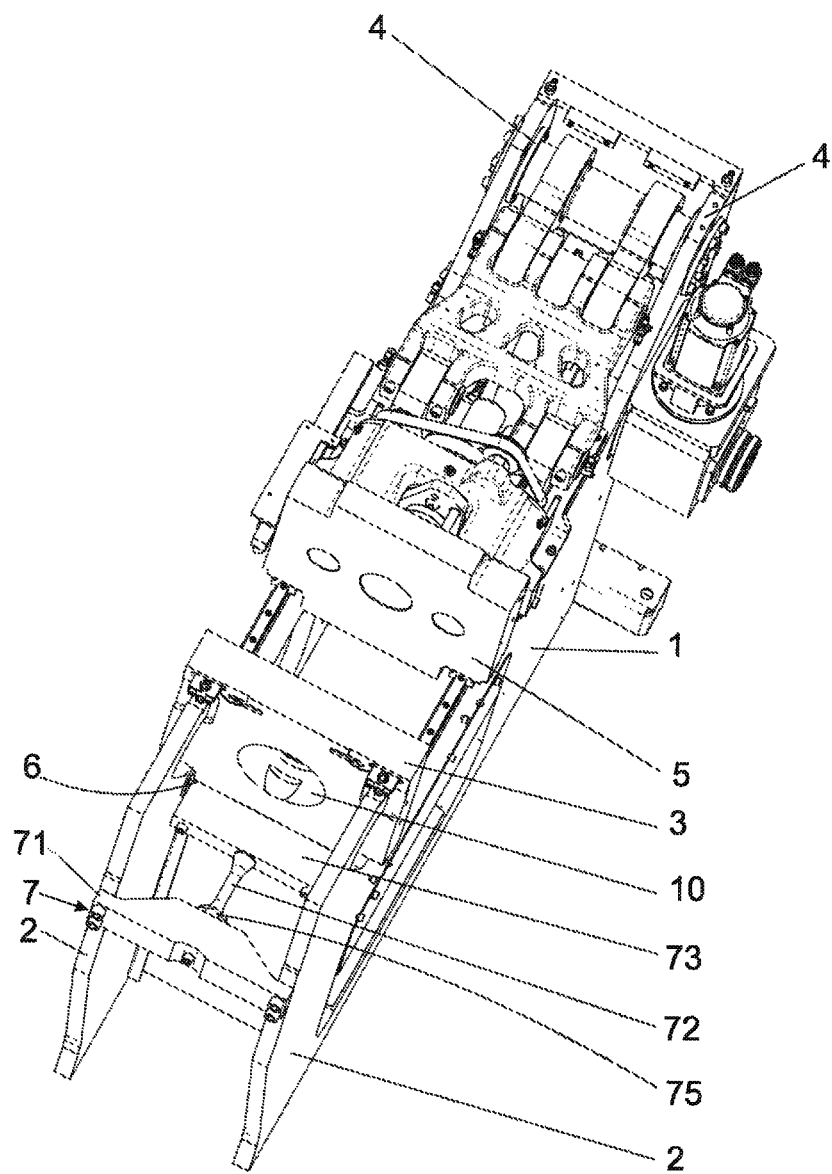
FIG. 1 shows an injection molding machine according to the present invention.

FIG. 1 shows an injection molding machine in a viewing direction inclined from above on to the machine frame 1. A stationary and a moveable mold mounting plate 3, 5 are arranged on the machine frame 1 in a known manner. It is also possible to see a closing mechanism for moving the moveable mold mounting plate 5 relative to the stationary mold mounting plate 3 in the direction of the longitudinal axis L of the machine. The stationary mold mounting plate 3 has a nozzle opening 10, into which a nozzle of an injection assembly (not shown) can be introduced. It is further possible to see a support element 7 which in this embodiment comprises a first flexural beam 73 fixedly connected to the stationary mold mounting plate 3 by screwing, a compression bar 72 connected to the first flexural beam 73, and a second flexural beam 71. The second flexural beam 71 is connected to a leg 2 of the machine frame 1. According to the invention, the second flexural beam 71 is connected free from backlash to the machine frame 1.

In the present case, two legs 2, 4 are respectively formed from two side plates of the machine frame 1, the side plates being arranged in a mutually spaced relationship transversely relative to the longitudinal axis of the injection molding machine.

The fixing of the stationary mold mounting plate 3 above its lower edge 6 to the machine frame 1 is selected so that approximately two thirds of the closing force is transmitted into the machine frame 1. The remaining third is diverted into the machine frame 1 by the support element 7. That portion can be varied by a change in the height of the fixed arrangement of the stationary mold mounting plate 3 above the lower edge 6. The support element 7 can remain in the lower region of the stationary mold mounting plate 3 and does not adversely affect the arrangement of the injection unit above the support element 7 in the central region of the stationary mold mounting plate 3.

The selected fixing of the stationary mold mounting plate 3 to the machine frame 1 by the support element 7 does not involve a change in the position of the stationary mold mounting plate 3 in space under the influence of the closing force. That provides the desired parallelism of mold halves (not shown) arranged on the mold mounting plates 3, 5, even under the influence of the closing force.

Figure 2:
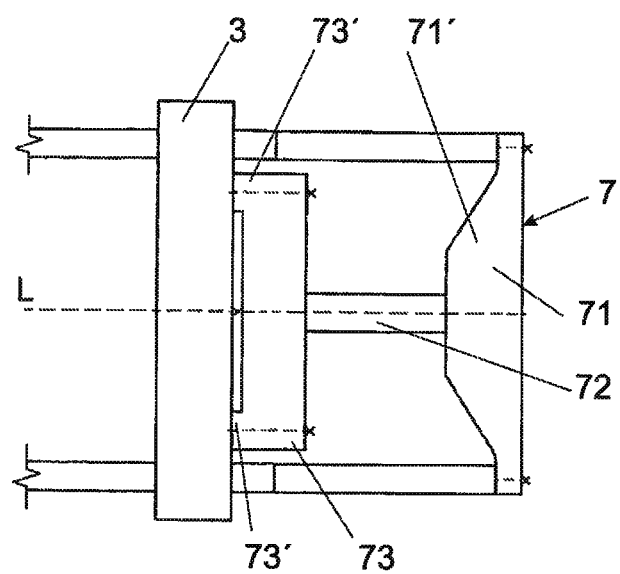
FIG. 2 is a plan view of the injection molding machine of FIG. 1.

FIG. 2 shows a plan view in relation to FIG. 1 in the region of the support element 7. It is possible to see that the first flexural beam 73 is fixed by extensions 73' to the stationary mold mounting plate 3 to provide sufficient space for the flexing of the first flexural beam 73. In other words—if the extensions 73' are considered as part of the first flexural beam 73—the first flexural beam 73 has a material weakening delimited by the extensions 73'. The central thickening 71' of the second flexural beam 71 is not absolutely necessary (see, for example, FIG. 5 where no such thickening 71' is provided). The extensions 73' could also be formed as a part of the stationary mold mounting plate 3.

It is preferable that at least one additional (a third/fourth) flexural beam (74) and at least one additional compression bar (72') are arranged between the first flexural beam (73), the compression bar (72), and the second flexural beam (71).

Figure 3:
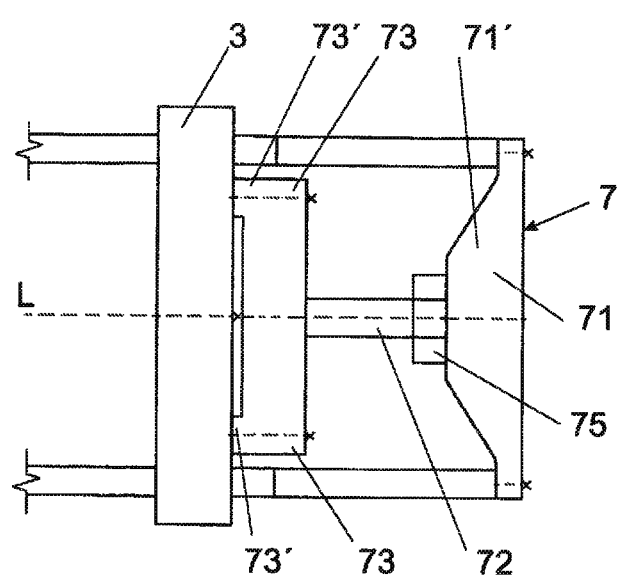
FIG. 3 shows a modified version of the injection molding machine of FIG. 1.
Figure 4:
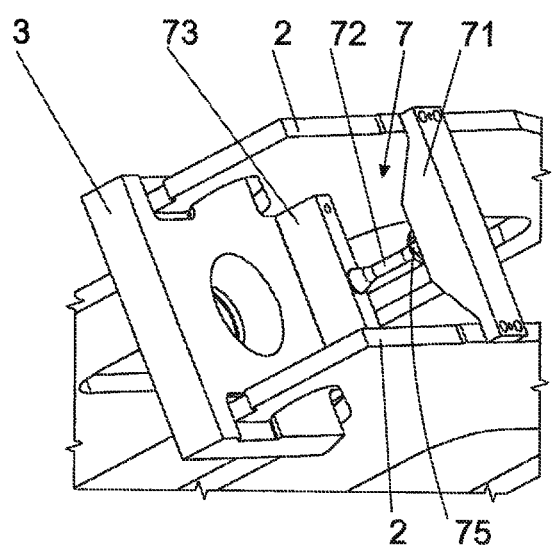
FIG. 4 is a detail view of the modified injection molding machine of FIG. 3.

FIG. 3 shows an alternative to FIG. 2, wherein an adjusting screw 75 is provided for adjustment of the parallelism of the mold mounting plates 3, 5 and therewith the mold halves arranged thereat. By way of the adjusting screw 75, the compression bar 72 can be displaced relative to the second flexural beam 71. Apart from that adjustment option, the second flexural beam 71 is fixedly connected to the compression bar 72. FIG. 4 shows a corresponding view of that detail.

Figure 5:
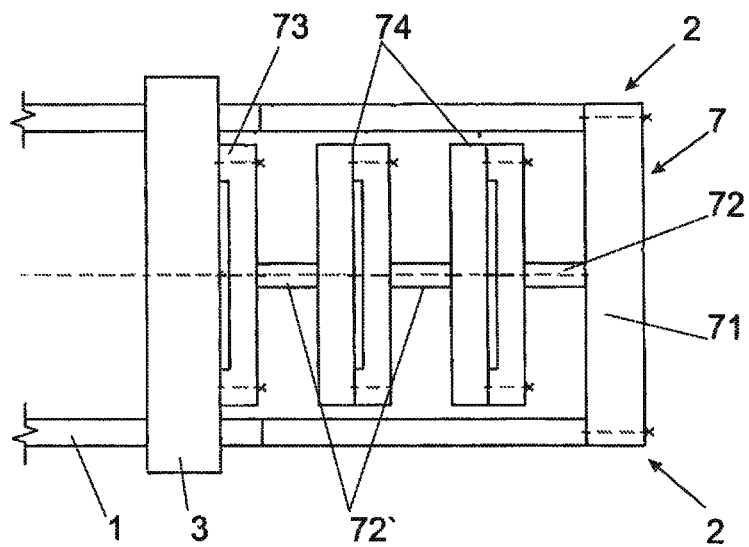
FIG. 5 shows a further modified version of the injection molding machine of FIG. 1.

FIG. 5 shows an alternative embodiment of the support element 7 (serial arrangement), here comprising three compression bars 72, 72' and four flexural beams 71, 73, 74 which are arranged serially viewed in the direction of the longitudinal axis L of the machine. The two additional flexural beams 74 here are each of a two-part structure and have a central material weakening. In other words, the parts of the additional flexural beams 74 arranged at the right in the Figure have extensions which space them from the parts of the additional flexural beams 74 arranged at the left in the Figure.

An adjusting screw 75 can also be provided in this embodiment.

Figure 6:
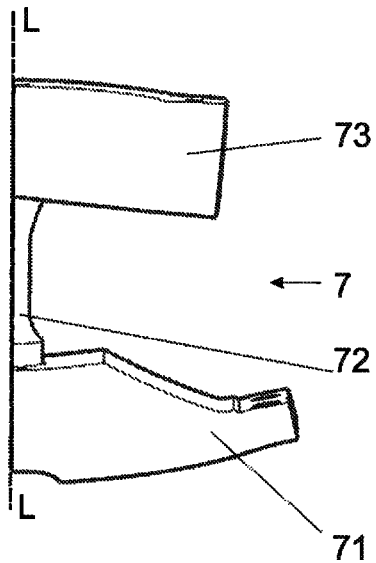
FIG. 6 shows the further modified version of the injection molding machine of FIG. 5 with detached support elements.

FIG. 6 shows the support elements 7 detached from the other structures in the deformed condition (that is to say, under the influence of the closing force). Only the one half of the support element 7 is shown, and the other half is afforded by mirroring at the longitudinal axis L of the machine.

Figure 7:
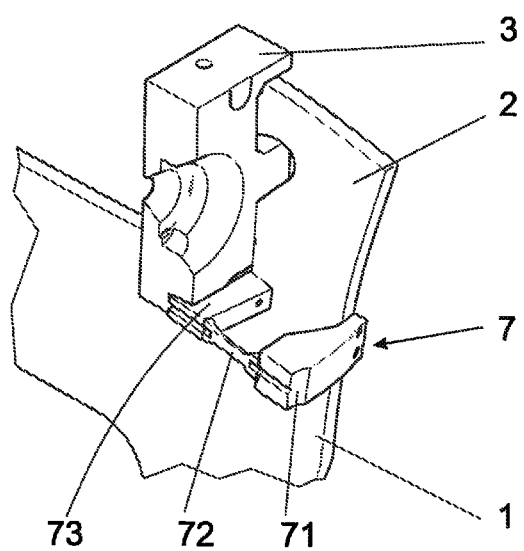
FIG. 7 shows a closing unit of the injection molding machine of the present invention.

FIG. 7 shows the closing unit in the region of the stationary mold mounting plate 3 in the deformed condition (that is to say, under the influence of the closing force). It will be seen that the stationary mold mounting plate 3 remains oriented vertically even in the deformed condition of the leg 2 of the machine frame 1 or of the support element 7.

The invention claimed is:

1. An injection molding machine closing unit comprising:
    a substantially C-shaped machine frame having a first leg and a second leg, said machine frame being configured such that free ends of said first leg and said second leg of said machine frame are deformed under influence of a closing force occurring during a closing operation;
    a stationary mold mounting plate mounted to said first leg of said machine frame;
    a moveable mold mounting plate;
    a closing mechanism mounted to said second leg, said closing mechanism being configured to drive said moveable mold mounting plate along a longitudinal direction of said machine frame;
    a support element for supporting said stationary mold mounting plate at a lower edge thereof on said machine frame against the closing force, said stationary mold mounting plate being fixedly connected to said first leg of said machine frame above said lower edge, said support element including:
        a flexural beam extending transversely relative to the longitudinal direction of said machine frame so as to receive a flexural force during the closing operation; and
        a compression bar extending along the longitudinal direction of said machine frame, said flexural beam being connected to said machine frame so as to be free from backlash.

2. The closing unit as set forth in claim 1, wherein said flexural beam is screwed to said machine frame.

3. The closing unit as set forth in claim 1, wherein said flexural beam is a first flexural beam, said support element further including a second flexural beam extending transversely relative to the longitudinal direction of said machine frame, said compression bar extending between said first flexural beam and said second flexural beam and being connected to both said first flexural beam and said second flexural beam.

4. The closing unit as set forth in claim 3, wherein said second flexural beam or said stationary mold mounting plate has extensions connecting said second flexural beam to said stationary mold mounting plate, said extensions being configured such that said stationary mold mounting plate bears against said second flexural beam under a nominal closing force.

5. The closing unit as set forth in claim 3, wherein said compression bar is a first compression bar, said support element further including a third flexural beam and a second compression bar arranged between said second flexural beam, said first compression bar, and said first flexural beam.

6. The closing unit as set forth in claim 1, wherein said support element is connected to said stationary mold mounting plate in a central region of said lower edge.

7. The closing unit as set forth in claim 1, wherein said compression bar is connected to said flexural beam so as to allow for adjustment of an inclination of said stationary mold mounting plate relative to said moveable mold mounting plate by an adjusting screw.

8. The closing unit as set forth in claim 1, wherein said support element is fixedly connected to said first leg at a height above said lower edge of said stationary mold mounting plate such that approximately a third of the closing force is transmitted to said machine frame by said support element.

9. An injection molding machine comprising the closing unit as set forth in claim 1.

\* \* \* \* \*